July 26, 1927.
G. CUENIN
1,637,294
APPARATUS FOR OBTAINING THREE-COLOR PHOTOGRAPHS
Filed Dec. 26, 1923
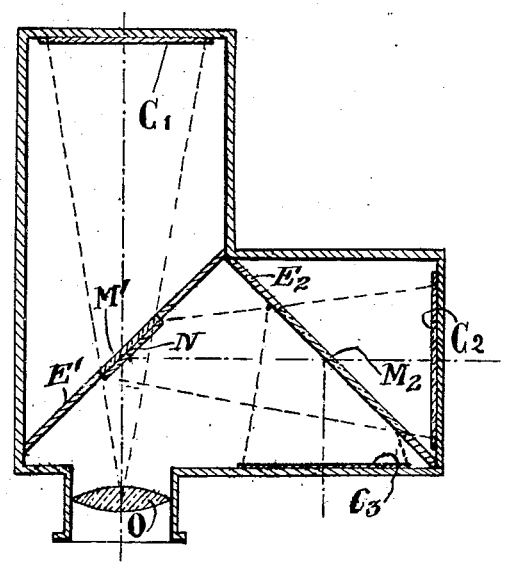
INVENTOR
Gilbert Cuenin
By
Robt, Robb & Hill.
Attorneys Patented July 26, 1927.

1,637,294

UNITED STATES PATENT OFFICE.

GILBERT CUENIN, OF PARIS, FRANCE, ASSIGNOR TO COMPAGNIE INTERNATIONALE TRICHROMIA, OF PARIS, FRANCE, A CORPORATION OF FRANCE.

APPARATUS FOR OBTAINING THREE-COLOR PHOTOGRAPHS.

Application filed December 26, 1923, Serial No. 682,784, and in France December 27, 1922.

The object of this invention is the production of photographs by the aid of three color records which give the appearance of natural colors when properly reproduced and combined.

According to this invention three identical negatives are taken at one time through two color screens while reflecting the image twice, the three negatives so obtained being used to obtain one direct positive and two superposed positives upon a single mount in different colors.

The camera comprises a lens whose emergent beam passes in part through a color screen on to a photographic plate and is in part reflected on to a second color screen, the luminous rays then passing in part through such screen on to a photographic plate and being in part reflected on to a third photographic plate.

A camera constructed in accordance with this invention is illustrated in the accompanying drawing which shows the camera in cross section.

Referring to the drawing, O is a single lens of suitable focal length mounted in a camera.

$C_1$ is a photographic plate which is directly in the path of the beam from the lens and which must be properly in focus. The emergent beam before reaching plate $C_1$ passes through a screen $M_1$ formed of an absolutely flat piece of glass coated on the lens side with a colored varnish orange red N for example while plate $C_1$ is sensitive to such color. The chamber containing plate $C_1$ is closed by an opaque screen $E_1$ such that the entire beam can pass but no reflection or diffusion is possible. Screen $M_1$ is arranged at an angle of 45° to the axis of the emergent beam.

By this means a portion of the luminous rays (the color red) will pass through the glass while the remainder will be reflected towards a second photographic plate $C_2$. The reflected beam will thus form at $C_2$ an image which will owing to the construction of the camera be in focus provided lens O is properly focused on plate $C_1$.

Before reaching plate $C_2$ the beam passes through a second screen $M_2$ formed of colored glass (green for example); screen $M_2$ is mounted in an opaque screen $E_2$ similar to screen $E_1$.

Screen $E_2$ is placed at an angle of 45° to the axis of the beam; the beam will consequently be both filtered and reflected; plate $C_2$ will receive green radiations to which it is sensitive while the remaining reflected radiations will fall upon a third photographic plate $C_3$; the construction of the camera is such that similarly as for plate $C_2$ the plate $C_3$ will be in correct focus.

Provided plate $C_3$ is very sensitive it will record all the violet rays, while as these rays nearly alone survive a double reflection, and as there is a substantial elimination of the other fundamental colors, the provision of a violet screen is unnecessary.

It will be seen that identical three color negatives are obtained at one exposure and with a proper construction of camera only one focusing on the direct plate is required.

An adjustment of screens $M_1$ $M_2$ and plates $C_2$ $C_3$ may previously be made in the work shop by tests made with screens $M_1$ $M_2$ formed of glass of different thicknesses but when once adjusted there is no necessity for alteration except when changing one or other of the screens.

The plates require consideration as they do not all receive the same quantity of light; if it were otherwise, such adjustment could be obtained by the ratio of the intensities of the screens $M_1$ $M_2$ which should be proportional to the actinic coefficient of the plates $C_1$ $C_2$ and taking into consideration that of plate $C_3$.

Having now particularly described and ascertained the nature of my said invention and in what manner the same is to be performed I declare that what I claim is:

1. In apparatus for taking three-color negatives simultaneously, the combination of an objective, a pair of color screens meeting at an angle of substantially 90 degrees and so arranged in advance of the objective that the emergent beam falls upon one of said screens, means for positioning a sensitized element in such relation to the last mentioned screen as to directly receive the rays passing through the same, means for positioning a second sensitized element in such relation to the second screen as to directly receive the rays reflected from the first screen passing through the said second screen, and means for positioning a third sensitized element in such position as to directly receive the rays reflected from the second screen.

2. In apparatus for taking three-color negatives simultaneously, the combination of an objective, a pair of color screens meeting at an angle of substantially 90 degrees and equally inclined to the axis of the objective, the first of said screens being arranged to receive the rays of the beam of light emerging from said objective, means for positioning a sensitized member in rear of said first screen to directly receive those rays of the light beam passing through the first mentioned screen, means for positioning a second sensitized member in rear of the second screen to directly receive those rays of the beam reflected from the first screen which pass through the second screen, and means for positioning a third sensitized member in front of the second screen to directly receive those rays reflected by the second screen.

3. Apparatus for taking three-color negatives simultaneously, comprising a focusing means arranged to produce a focused beam, a reflecting color filter adapted to pass or transmit orange-red rays and reflect the remainder of the visible spectrum, and arranged in the path of the incident focused beam at an angle of substantially 45 degrees thereto, means for positioning a sensitized element in the path of the beam directly behind the reflecting color filter, a second reflecting color filter, adapted to pass or transmit green rays and reflect a portion of the rays not transmitted, arranged directly in and at an angle of substantially 45 degrees to the beam of rays reflected from the first mentioned reflecting filter, means for positioning a sensitized element in the path of the said reflected rays directly behind the said second reflecting filter, and means for positioning a sensitized element directly in the path of the second reflected beam of rays.

4. Apparatus for taking three-color negatives simultaneously, comprising means for forming an incident beam of light, a dichroic transmitting reflector adapted to transmit substantially the whole of the lower band or long wave portion of the visible spectrum and reflect substantially the whole of both the intermediate band or intermediate wave length portion and the higher band or short wave portion, and arranged in the path of the incident beam at an angle of substantially 45 degrees thereto to permit the transmitted beam to extend in one direction and the reflected beam to extend in another direction, means for positioning a low-band-sensitive element in a position to directly receive the rays of the transmitted beam, a second transmitting reflector adapted to transmit substantially the whole of the intermediate band or intermediate wave length portion of the said spectrum and reflect a large portion of the higher band or short wave portion and positioned directly in the path of the first reflected beam at an angle of substantially 45 degrees thereto to permit the second transmitted beam to extend in one direction and the second reflected beam to extend in another direction, means for positioning an intermediate-band-sensitive element in a position to directly receive the rays of said second transmitted beam, and means for positioning a high-band-sensitive element in a position to directly receive the rays of the second reflected beam.

5. Apparatus for taking three-color negatives simultaneously, comprising a focusing means arranged to produce a focused beam, a reflecting color filter arranged in the path of the incident beam adapted to pass or transmit substantially all the rays of a given color and reflect substantially all the remaining rays of the incident beam, a second reflecting filter arranged in the path of the reflected beam adapted to pass or transmit substantially all of the rays of the reflected beam of a given color and reflect a large portion of all the remaining rays, means for positioning a sensitized element directly in the path of the first mentioned transmitted beam, means for positioning a second sensitized element directly in the path of said second transmitted beam, and means for positioning a third sensitized element directly in the path of said second reflected beam.

GILBERT CUENIN.